INVENTOR.
KENNETH E. PERRY

INVENTOR.
KENNETH E. PERRY

Oct. 31, 1967
K. E. PERRY
3,350,707
UNIVERSAL DIGITAL INFORMATION SYSTEM
Filed Aug. 30, 1965
3 Sheets-Sheet 3
VOLTAGE AT LADDER NETWORK LN
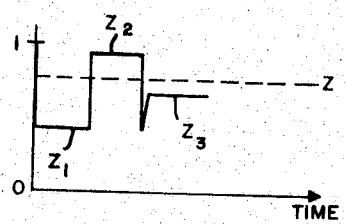
FIG. 3A
ERROR SIGNAL OUTPUT OF BRIDGE AT 14
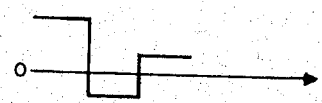
FIG. 3B
LEVEL QUANTIZER OUTPUT AT D
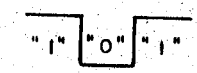
FIG. 3C
OUTPUT FLIP FLOP FF
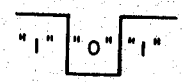
FIG. 3D
FIG. 4
INVENTOR.
KENNETH E. PERRY
BY Rines and Rines
ATTORNEYS

United States Patent Office 3,350,707
Patented Oct. 31, 1967

3,350,707
UNIVERSAL DIGITAL INFORMATION SYSTEM
Kenneth E. Perry, Wayland, Mass., assignor to Geodyne Corporation, Waltham, Mass., a corporation of Massachusetts
Filed Aug. 30, 1965, Ser. No. 483,443
10 Claims. (Cl. 340—347)

ABSTRACT OF THE DISCLOSURE

System for transmitting digitized data from a plurality of sources, such as underwater sensors (including a salinometer bridge) in which switching circuits of an analog-to-digital converter associated with one source are time shared for use as a shift register to receive and read out digitized data from other sources.

---

The present invention relates to digital information systems and, more particularly, to universal systems adapted for sequential transmission of bit formats of digital data from a plurality of sensor devices respectively responsive to a plurality of measured or detected events manifested by variations in any and all of the voltage, current, impedance (including resistance), frequency, motion and the like, as for such purposes as the underwater monitoring of a plurality of phenomena or for similar and related applications.

In monitoring systems of the above-described character, in order to avoid duplication of equipment and undue size and complexity of the same, it is highly desirable to provide a universal information accepting and transmitting system which can be used sequentially in common to transmit digital data representative of changes detected in many and varied types of detecting, monitoring or measuring instruments or devices despite the widely different characteristics of such instruments and devices and their responding to vastly different types of phenomena. It is to the attainment of this goal that the present invention is primarily directed.

An object of the invention, accordingly, is to provide a new and improved digital information system universally employable for the transmission of bit formats of digital data representative of changes in any and all of voltage, current, impedance (including resistance within that term), frequency, mechanical motion, and other parameters and phenomena detectable as voltage, current impedance or frequency (including phase) changes.

A further object is to provide a novel digital information system of more general utility, as well.

Still another object is to provide a novel digital data sequential monitoring and transmitting system adapted to transmit any desired combination of voltage, curent or imedance changes (caused by temperature, conductivity and other related phenomena), frequency and mechanical motion, and novel sub-combinations thereof.

Other and further objects will be explained hereinafter and will be more particularly delineated in the appended claims. In summary, however, underlying one of the principal features of the invention, is a novel system embodying switching circuits, preferably of the flip-flop type, usable universally alternately with analog-to-digital converter apparatus for digital conversion, and as a storage register for parallel entry from a plurality of sensor devices. Preferred details will be hereinafter set forth.

The invention will now be described with reference to the accompanying drawing, FIG. 1 of which is a block diagram of a system embodying the invention;

FIGS. 3A through 3D are explanatory graphs and wave forms illustrative of the operation of the system of FIGS. 1 and 2; and FIG. 4 is a circuit diagram of a preferred salinometer bridge for use in the systems of FIGS. 1 and 2.

While for purposes of illustration, the invention will be described in connection with specific types of sensors and monitoring instruments particularly useful in underwater sensing and transmitting systems, it is to be understood that the underlying principles of the invention are of much broader application and are universally adaptable for use with many different types of sensors and instruments and applications of the same.

Figure 1:
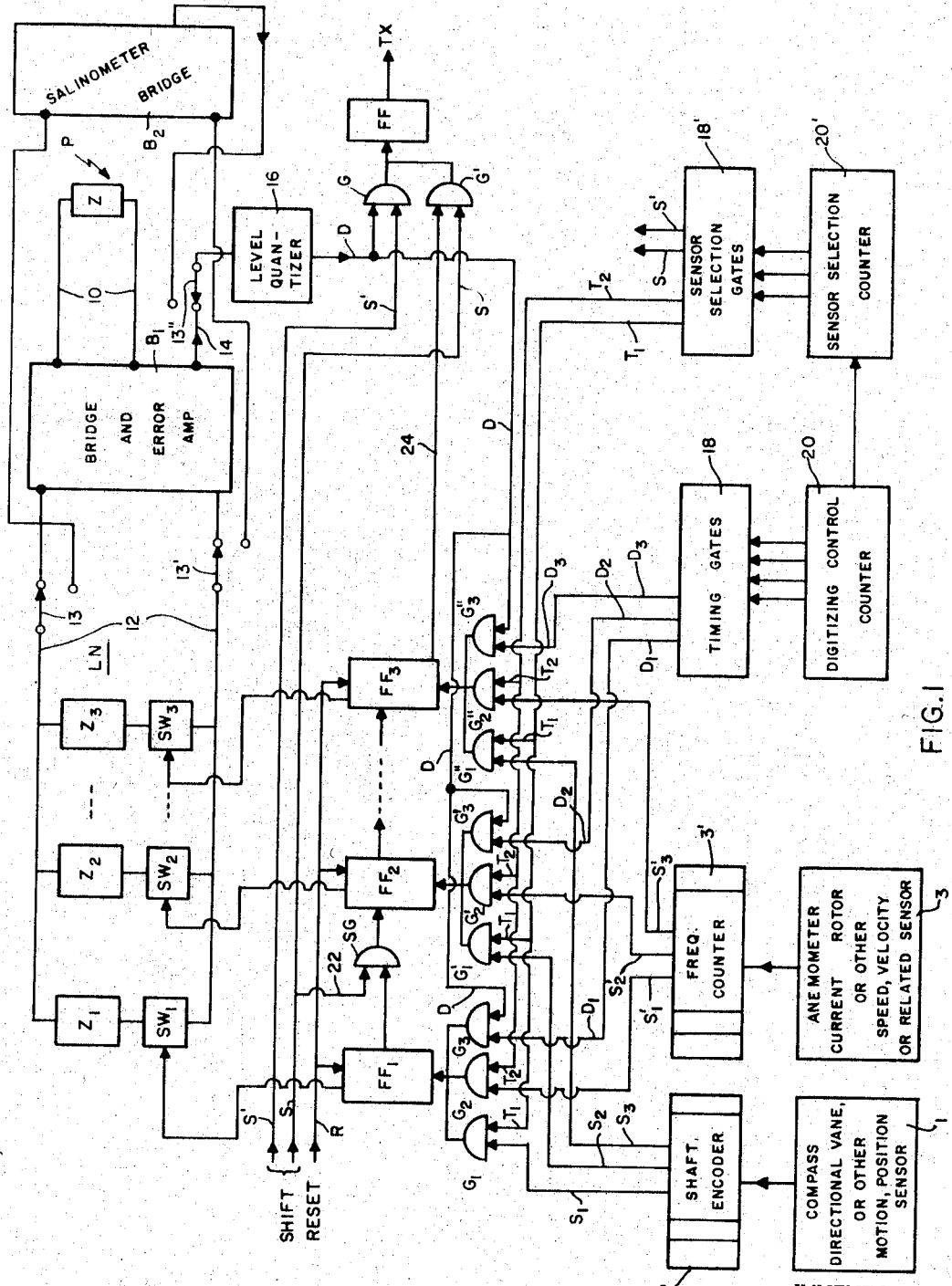

In the illustrative example of FIG. 1, it is desired first to transmit bit formats of digital data representative of changes in, for example, the impedance Z, shown in the upper right-hand corner, representative of, say, temperature. To this end, the element Z may comprise a thermistor connected in an arm 10 of any conventional bridge $B_1$, such as of the Wheatstone type, to affect the balance by the change in resistance thereof in response to surrounding temperature. For measuring voltage, of course, a potentiometric type bridge could be employed. Other types of parameters measurable in this manner include pressure or displacement, the sensors Z for which may be similarly connected to the bridge and the impedance, voltage or current changes in which are a measure of and thus representative of changes in the physical parameters or phenomena (schematically designated at P) acting upon the element Z, correspondingly to alter its characteristics. It is necessary, then, to take the analog information represented by the impedance, voltage or current, corresponding to the sensed parameter or phenomena monitored at Z, and convert the same into digital bit format for transmission to the station (such as a vessel) monitoring this underwater system, in the above illustrative example.

This end is achieved with the aid of an analog-to-digital converter comprising a plurality of flip-flop switching stages $FF_1$, $FF_2$ ... $FF_3$, etc., each adapted to operate corresponding switching devices $SW_1$, $SW_2$ ... $SW_3$, etc., to add or remove corresponding resistors or other impedance elements $Z_1$, $Z_2$ ... $Z_3$, etc. (each of successively preferably one-half the value of the preceding resistor) constituting a parallel ladder network LN. Depending upon which switching stages $FF_1$, $FF_2$, etc. are conducting and thus which impedance elements $Z_1$, $Z_2$, etc. are switched by elements $SW_1$, $SW_2$, etc. into the ladder network LN, different resultant output values of ladder impedance (or current) will result and may be applied at 12 to an arm of the bridge $B_1$ opposing and thus compared with the impedance value or output of the sensing element Z. The difference between the resultant output impedance value, for example, of ladder network LN at any moment and the corresponding output impedance of Z, will be indicated by a conventional comparison error amplifier in the bridge $B_1$, with the error signal output generated by such comparison resulting at 14. The error signal may then be level quantized at 16 with respect to zero, as later discussed, producing at D, bits of digital data. These data are also fed back along D to digitizer gates $G_3$, $G_3'$ ... $G_3''$ corresponding to respective flip-flop stages $FF_1$, $FF_2$ ... $FF_3$, the gates requiring simultaneous input from timing gates 18 fed from a digitizing control counter 20. There will be produced from the timing gates 18, in response to the counting of successive counter stages at 20, successive digitizer pulses $D_1$, $D_2$, $D_3$, etc., shown applied by conductors bearing those letters as the other input to the respective gates $G_3$, $G_3'$, $G_3''$, etc. Thus, if the resultant output value of ladder impedance differs from that of Z, the flip-flops $FF_1$, $FF_2$ ... $FF_3$ will be individually and separately gated in response to the digitized error signal input and the count at 20 operating the corresponding timing gate at 18. Thus, by succesive approximations, those flip-flops will remain energized or set, the corresponding ladder resistances of which cumulatively substantially balance or equal the value of Z. The error signal will then be reduced towards zero. The settings of the impulse counters corresponding to the successive flip-flops will constitute a digitized representation of the value of Z and there will result at D successive digital bits constituting serial digitized output data representative of the value of Z and thus the phenomenon controlling the element Z.

As an illustration, assume that there are but the three illustrated flip flops $FF_1$, $FF_2$ and $FF_3$ and that the value of Z is represented by the dotted line "Z" in the voltage versus time graph of FIG. 3A. The first flip-flop $FF_1$, under action of the corresponding counter at 20 and timing gate at 18 that provides an input at $D_1$ to gate $G_3$ at the time an output exists at the quantized error-signal output D (also applied to gate $G_3$), will become set or rendered conductive, operating switch $SW_1$ and connecting resistor $Z_1$ into the ladder network LN. This is shown by the horizontal line "$Z_1$" in FIG. 3A. But this is only, say, half the value of Z, so that more resistance must be inserted in the network. Thus a following pulse at $D_2$ fed to gate $G_3'$ while the error signal (less than the reference or threshold level "Z") is applied at D thereto, sets $FF_2$ to operate $SW_2$ and add resistor $Z_2$ (of value $Z_1/2$) to the ladder LN. As indicated at "$Z_2$" in FIG. 3A, however, the resultant voltage at LN is now greater than the level "Z." The error signal at D now exceeds the threshold or reference level so that $FF_2$ becomes re-set and the next flip flop $FF_3$ becomes set to add $Z_3$ (of value $Z_2/2$) to the network LN, as shown at "$Z_3$" in FIG. 3A, approximating closer to balancing the level "Z." The error signal output at 14 for these successive operations is shown in FIG. 3B, and the corresponding output of the level quantizer 16 at D (FIG. 3C) results in the successive digital bits represented by "1," "0" and "1," corresponding to $FF_1$ set, $FF_2$ reset and $FF_3$ set. This digitized data is applied to a normally open gate G and through a momentary storage flip-flop FF that delays the output preferably the time of one pulse, to produce the digitized data signal of FIG. 3D that is to be transmitted by any conventional modulation or other transmitter TX. Thus, the signal information as to phenomenon P affecting sensor Z is transmitted digitally. In view of the requirement for universal use of this system, as previously discussed, the system is adapted also to transmit digitized data from any of a plurality of mechanical motion, position, speed, frequency, velocity or movement sensors, among others, such as, for example, a compass or directional vane indicator 1 and an anemometer or water current rotor 3. For operation with this type of sensing, as distinguished from the analog-to-digital conversion requirement previously discussed, the same flip flop switching stages $FF_1$, $FF_2$ . . . $FF_3$, etc. are now automatically connected serially to operate as a storage shift register in a manner now to be explained. The sensor 1 is connected to operate a digitizing shaft encoder 1' to provide from its plurality of digital stages (corresponding to the number of flip-flops) data pulses at $S_1$, $S_2$ and $S_3$, etc. for each of the further gates $G_1$, $G_1'$, and $G_1''$, etc., while the sensor 3 sets frequency counters to provide digitized outputs $S_1'$, $S_2'$ and $S_3'$, etc. for each of the third set of gates $G_2$, $G_2'$, $G_2''$, etc.

After the transmission of the first signal at D resulting from the operation of the analog-to-digital conversion of the impedance or other measurement at Z, the digitizing control counter 20 causes sensor selection counter 20' to actuate corresponding sensor selection gates 18', producing shift signals at S–S' (for the before-mentioned shift-register mode of connection and operation of $FF_1$, $FF_2$ . . . $FF_3$), and successive sensor selection gating signals or pulses $T_1$ and $T_2$, respectively successively applied to gates $G_1$, $G_1'$, $G_1''$ and $G_2$, $G_2'$ and $G_2''$. The data in the shaft encoder digitizer stages 1 that correspond to each flip-flop $FF_1$, $FF_2$ . . . $FF_3$, will thus, upon application of the sensor selection pulse $T_1$, transfer or be applied in parallel into the respective flip-flops, now connected as a storage shift register chain by application of the shift pulse at S to inter-stage serial coupling gates, such as at 22 in connection with gate SG between $FF_1$ and $FF_2$. In this manner, the same circuit elements are now used to transmit to the output flip-flop FF, via gate G', the output of the shift register at 24, which is applied to the gate G' with the shift pulse at S. A digitized signal representative of the motion or position sensed at 1 is thus now transmitted, gate G being disabled by a further shift pulse S'.

In similar fashion, the next selection pulse $T_2$ in sequence causes the count in the plurality frequency counter stages at 3' (corresponding to the number of flip-flops) to transfer in parallel along $S_1'$ $S_2'$ and $S_3'$ to flip-flops $FF_1$, $FF_2$ and $FF_3$, being then shifted out at 24 and passed through gate G' to the output momentary storage flip-flop FF and thence to the transmitter TX.

Figure 2:
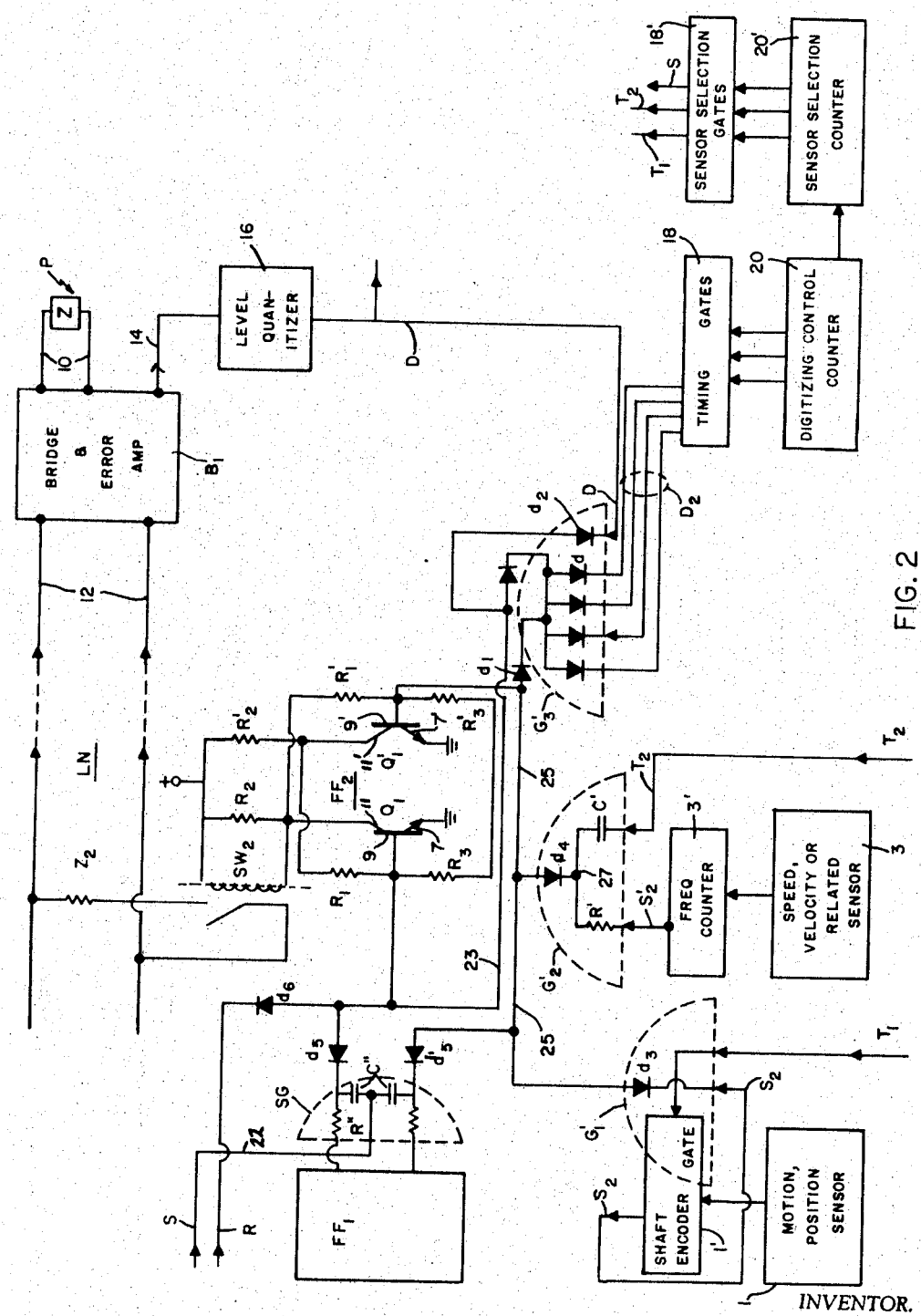
FIG. 2 is a fragmentary schematic circuit diagram and block diagram of preferred circuits for use in the system of FIG. 1.

A preferred circuit configuration for the system of FIG. 1 is illustrated in FIG. 2 in connection with flip-flop stage $FF_2$ and gates $G_1'$, $G_2'$ and $G_3'$, similar numerals and letters being used to identify the same parts in FIGS. 1 and 2. $FF_2$ comprises a pair of transistors $Q_1$ and $Q_1'$ the respective emitters 7 and 7' of which are shown grounded and with each of the respective bases 9 and 9' connected to the collectors 11' and 11 of the other transistor through resistors $R_1$ and $R_1'$. Collector resistors $R_2$ and $R_2'$ connect the collectors 11 and 11' to the positive supply terminal + and the collector 11 connects to the switch $SW_2$, shown in the form of a relay coil with a switch to the left thereof. Operation of the relay $SW_2$ causes $Z_2$ to be connected across the ladder network arm 12. The bases 9 and 9' are interconnected by respective resistors $R_3$ and $R_3'$. It is to be understood, however, that in order not to confuse the circuit diagram with details unnecessary to an explanation of the operation, conventional bias networks and the like and coupling capacitors have been deliberately omitted.

The gate $G_3'$ is shown receiving four inputs at $D_2$ for four common-anode-connected diodes $d$ that correspond to four stages in the digitizing control counter 20, the diodes being connected through further diode $d_1$ to the base 9' of transistor $Q_1'$. The other gating input for $G_3'$ is shown applied at D from the quantizer 16 and through diode $d_2$ along conductor 23 to the base 9 of transistor $Q_1$.

The gate $G_1'$ for the digitized data produced by shaft encoder 1' in response to sensor 1 may include a gating portion of the encoder (labelled "GATE") responsive to the selection from sensor selection gate 18' fed along $T_1$, and a diode $d_3$ connected at $S_2$ to receive the encoder output and to pass the same via conductor 25 to the base 9' of transistor $Q^{1'}$. Gate $G_2'$, on the other hand, is of a resistance-capacitance delay type embodying elements R' and C', respectively connected to the output $S_2'$ of frequency counter 3' and the sensor selection gate output $T_2$, and connected together at 27. From the point 27, connection continues through a further diode $d_4$ to the conductor 25, and thus to the base 9' of $Q_1'$.

The gate SG coupling successive flip-flops $FF_1$ and $FF_2$ during the shift register mode of operation thereof is shown also of the resistance-capacitance time-delay network type R''–C'', with diodes $d_5$ and $d_5'$ enabling serial connection to the respective bases 9 and 9'. Reset pulses are applicable along R through diode $d_6$ to the base 9.

Highly successful sequential digital transmission in such an underwater system has been obtained with twelve flip-flops for a 12-bit word, formatted into a 16-bit word for simplicity of counting, through the use of binary counters. Each word or signal in the system is cyclically transmitted in a time period of, for example, one-eight of a second, with the same time period preferably used for each sensor measurement.

The digitizing control counter 20 and the sensor selection counter 20' may be of any desired suitable type, such as, for example, embodying the Geodyne Corporation (Waltham, Massachusetts) Model A-420 flip-flop circuits, as described in Geodyne Bulletins Nos. S-72 and S-93, respectively dated 8/28/63 and 11/15/63. The timing and selector gates similarly may assume any conventional configuration including, for example, the Geodyne Models A-400-C and A-405 (Bulletins S-70 and S-74 of 8/28/63 and 9/4/63, respectively). The level quantizer, as another illustration, may be of the operational amplifier type, such as the P65 of Philbrick Research, Inc. of Boston, Massachusetts.

Not only is the invention thus universally useful with various types of sensors and analog-to-digital conversion devices, but it is readily adapted to digitize bridge and other sensing or detecting circuits, as well. Thus, in FIG. 1, the operation of switches 13, 13' and 13" to their other switch positions, substitutes a salinometer or other conductivity bridge $B_2$ for the bridge $B_1$, and automatically digitizes the same. This is more particularly shown in FIG. 4 wherein a pair of axially alined preferably toroidal cores TC and TC' are immersed in a saline solution (such as sea-water) to provide a sea loop indicated by dotted lines and the dotted resistance $R'''$. An exciting arm or winding $W_1$ on core TC is energized from a source A.C., and an output arm or winding $W_1'$ on coupled core TC' is connected to a phase detector and amplifier, so labelled, with reference phase applied from the source A.C., as is well-known. A bucking field is set up in auxiliary windings $W_2$ and $W_2'$ on respective cores TC and TC' for balancing out the induced voltage at $W_1'$, thus providing by the amount of required bucking current, a measure of the value of $R'''$ or of the salinity or conductivity desired to be measured. In accordance with the invention, the system $16-D-G_3$, $G_3'$, $G_3''-FF_1$, $FF_2$, $FF_3-SW_1$, $SW_2$, $SW_3-Z_1$, $Z_2$, $Z_3$ readily adapts the salinity bridge to automatic digitized operation by connecting the bucking windings $W_2$ and $W_2'$ in series across the ladder LN at 12, as shown in FIG. 4.

Further modifications will also occur to those skilled in the art, and all such are considered to fall within the spirit and scope of the invention as defined in the appended claims.

What is claimed is:

1. Universal digital information system for enabling the sequential transmission of bit formats of digital data representative of changes in an electrical parameter and of sensor signals, having, in combination, a source of a changeable electrical parameter, analog-to-digital converter means comprising a plurality of switching circuits for producing a resultant output, means connected to said source and said converter means for comparing said parameter and said resultant output, means connected to said comparing means for individually and separately operating the switching circuits to vary said resultant output into substantial balance with changes in said electrical parameter, thereby to produce a first digital output representative of said changes, means connected to said converter means for transmitting said first digital output as a first signal, sensor means, means connected with the sensor means for digitizing the output of the sensor means to produce a further digital output, means for serially connecting the said plurality of switching circuits as a shift register, means connected with the digitizing means for parallelly transferring said further digital output to the said plurality of switching circuits of the shift register, and means connected to said switching circuits for transmitting the resulting digital data from the shift register as a further signal.

2. Universal digital information system for enabling the transmission of bit formats of digital data representative of changes in an electrical parameter and various phenomena changes, having, in combination, analog-to-digital converter means comprising a plurality of switching circuits connected with counter means for operating successive of the circuits to produce an effective resultant output in accordance with the count of the counter means, sensing means for sensing an electrical parameter and producing a further output representative of a first signal to be transmitted, means connected to said sensing means and said converter means for comparing said further output with the said effective resultant output to generate an error signal, means connected to said comparing means for level quantizing the said error signal, means connected to said level quantizing means for feeding the error signal back to the switching circuits to cause the counter means to control said switching circuits to reduce the error signal towards zero, and means connected to said level quantizing means to produce a first digital output representative of the said first signal; further sensing means for producing a second signal representative of a sensed phenomenon and means for digitizing the same; means operable following the production of the said first digital output for connecting the said plurality of switching circuits in a serial chain to constitute a storage shift register; means connected to said digitizing means for thereupon applying the digitized second signal in parallel to the said plurality of switching circuits; and means connected to said switching circuits for shifting the stored second digitized signal out of the shift register to produce a second digital output representative of the said second signal.

3. A system as claimed in claim 2 and in which each switching circuit is provided with a gate, the said counter means is connected through timing gate means to each such gate and each such gate is connected with the said quantizing means.

4. A system as claimed in claim 3 and in which each switching circuit is provided with a second gate, further counter means is provided connected through selection gate means to each second gate, and each second gate is connected with the said digitizing means.

5. A system as claimed in claim 4 and in which the said digitizing means comprises a plurality of digital stages corresponding to the plurality of switching circuits and the second gate of each switching circuit is connected with the corresponding digital stage of the said digitizing means.

6. A system as claimed in claim 4 and in which the said selection gate means produces shift pulses for operation in the said shifting means.

7. A system as claimed in claim 4 and in which the said quantizing means is further connected with a momentary storage output switching stage delaying the transmission of the said first signal a predetermined time interval.

8. A system as claimed in claim 7 and in which additional gate means is provided between each of the said quantizing means and the shift register, on the one hand, and the said output momentary storage switching stage on the other, the said shifting means rendering the additional gate means alternately operative to provide sequential feeding from the quantizing means and the shift register to the said output momentary switching stage.

9. A system as claimed in claim 2 and in which the said switching circuits comprise transistor flip-flops each provided with a relay switch, and a resistance ladder network of a plurality of successively smaller-valued resistances, one connectable into and out of the network by each relay switch, the serial connections between successive flip-flops in the said serial chain shift register comprising time-delay gate means controlled by the said shifting means.

10. A system as claimed in claim 2 and in which there is provided additional sensing and corresponding digitizing means for producing additional digitized signals representative of additional sensed phenomena, and means for sequentially applying such additional digitized signals to the switching circuits of the shift register to enable the shifting means to shift out of the shift register corresponding sequential additional digital outputs representative of the corresponding said additional signals.

References Cited

UNITED STATES PATENTS

| | | | |
|---|---|---|---|
| 2,901,685 | 8/1959 | Alder | 323—74 |
| 2,973,505 | 2/1961 | Johannesen | 340—18 |
| 2,996,669 | 8/1961 | Morgan et al. | 329—99 |
| 2,997,704 | 8/1961 | Gordon et al. | 340—347 |
| 3,045,210 | 7/1962 | Langley | 340—150 |
| 3,157,873 | 11/1964 | Slack | 340—347 |
| 3,167,757 | 1/1965 | D'Aquila | 340—347 |
| 3,182,303 | 5/1965 | Howe | 340—347 |
| 3,221,326 | 11/1965 | Lawhon | 340—347 |
| 3,239,833 | 3/1966 | Gray | 340—347 |

DARYL W. COOK, *Acting Primary Examiner.*

W. J. KOPACZ, *Assistant Examiner.*